US012145062B2

(12) United States Patent
Guan et al.

(10) Patent No.: US 12,145,062 B2
(45) Date of Patent: Nov. 19, 2024

(54) METHOD AND APPARATUS FOR CONTROLLING PERSPECTIVE SWITCHING, ELECTRONIC DEVICE AND READABLE STORAGE MEDIUM

(71) Applicant: TENCENT TECHNOLOGY (SHENZHEN) COMPANY LIMITED, Shenzhen (CN)

(72) Inventors: Yajun Guan, Shenzhen (CN); Guangze Zhong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 474 days.

(21) Appl. No.: 17/383,851

(22) Filed: Jul. 23, 2021

(65) Prior Publication Data
US 2021/0346802 A1    Nov. 11, 2021

Related U.S. Application Data

(63) Continuation of application No. PCT/CN2020/096405, filed on Jun. 16, 2020.

(30) Foreign Application Priority Data

Jun. 21, 2019   (CN) .......................... 201910544427.0

(51) Int. Cl.
*A63F 13/5258*   (2014.01)
*A63F 13/56*   (2014.01)
(Continued)

(52) U.S. Cl.
CPC .......... *A63F 13/5258* (2014.09); *A63F 13/56* (2014.09); *A63F 13/57* (2014.09);
(Continued)

(58) Field of Classification Search
CPC . A63F 13/525; A63F 13/5252; A63F 13/5258
See application file for complete search history.

(56) References Cited

U.S. PATENT DOCUMENTS 6,010,403 A     1/2000  Adam
6,309,301 B1 *  10/2001 Sano ........................ A63F 13/33
                                                               463/40
(Continued)

FOREIGN PATENT DOCUMENTS

CN          1802193 A     7/2006
CN        105597310 A     5/2016
(Continued)

OTHER PUBLICATIONS

The State Intellectual Property Office of the People's Republic of China (SIPO) Office Action 1 for for 201910544427.0 Jan. 6, 2020 8 Pages (including translation).
(Continued)

*Primary Examiner* — Steven J Hylinski
(74) *Attorney, Agent, or Firm* — ANOVA LAW GROUP, PLLC

(57) ABSTRACT

This application discloses a method and apparatus for switching perspectives in a computer game, an electronic device and a computer-readable storage medium. The method includes displaying a virtual scene picture in a game from a target perspective in a client; triggering a key stage in the game and determining a key perspective corresponding to the key stage; and automatically switching the target perspective to the key perspective to display a key scene picture from the key perspective in the client.

11 Claims, 11 Drawing Sheets

(51) Int. Cl.
*A63F 13/57* (2014.01)
*A63F 13/65* (2014.01)
*A63F 13/798* (2014.01)
*A63F 13/803* (2014.01)

(52) U.S. Cl.
CPC ............ *A63F 13/65* (2014.09); *A63F 13/798* (2014.09); *A63F 13/803* (2014.09); *A63F 2300/6661* (2013.01); *A63F 2300/6669* (2013.01)

(56) References Cited

U.S. PATENT DOCUMENTS

| | | | |
|---|---|---|---|
| 6,409,596 B1 * | 6/2002 | Hayashida | A63F 13/53 463/31 |
| 8,502,817 B2 * | 8/2013 | Deb | G06T 19/003 345/422 |
| 2002/0191840 A1 | 2/2002 | Ochi et al. | |
| 2002/0075264 A1 | 6/2002 | Takashi | |
| 2004/0219980 A1 * | 11/2004 | Bassett | A63F 13/10 463/6 |
| 2006/0135256 A1 | 6/2006 | Toyama | |
| 2007/0298881 A1 * | 12/2007 | Kawamura | A63F 13/833 463/33 |
| 2008/0039164 A1 | 2/2008 | Shimada | |
| 2013/0316815 A1 | 11/2013 | Fujii et al. | |
| 2015/0082283 A1 | 3/2015 | Smith et al. | |
| 2016/0250553 A1 | 9/2016 | Ikenaga et al. | |
| 2018/0326302 A1 | 11/2018 | Tsutsui | |
| 2019/0192968 A1 | 6/2019 | He et al. | |

FOREIGN PATENT DOCUMENTS

| | | | | |
|---|---|---|---|---|
| CN | 105705211 | A | 6/2016 | |
| CN | 106528020 | A | 3/2017 | |
| CN | 108245889 | A | 7/2018 | |
| CN | 109107156 | A | 1/2019 | |
| CN | 109692480 | A | 4/2019 | |
| CN | 109806596 | A | 5/2019 | |
| CN | 110227254 | A | 9/2019 | |
| GB | 2571378 | A * | 8/2019 | ............ A63F 13/00 |
| JP | H07116343 | A * | 5/1995 | |
| JP | H07155471 | A * | 6/1995 | |
| JP | H07155472 | A * | 6/1995 | |
| JP | H07178242 | A * | 7/1995 | |
| JP | H07244746 | A * | 9/1995 | |
| JP | H08224376 | A | 9/1995 | |
| JP | H08215433 | A * | 8/1996 | |
| JP | H10328418 | A * | 12/1998 | |
| JP | H1170271 | A * | 3/1999 | |
| JP | H11207029 | A * | 8/1999 | |
| JP | 2000126457 | A | 5/2000 | |
| JP | 2000153063 | A | 6/2000 | |
| JP | 2001229393 | A | 8/2001 | |
| JP | 2004318558 | A * | 11/2004 | ............ A63F 13/10 |
| JP | 3767094 | B2 * | 4/2006 | ............ A63F 13/10 |
| JP | 2008043484 | A | 2/2008 | |
| JP | 2013240523 | A | 12/2013 | |
| JP | 2014061037 | A | 4/2014 | |
| JP | 2015082283 | A | 4/2015 | |
| JP | 2018191769 | A | 12/2018 | |

OTHER PUBLICATIONS

The World Intellectual Property Organization (WIPO) International Search Report for PCT/CN2020/096405 Aug. 28, 2020 6 Pages (including translation).
Japan Patent Office (JPO) The Office Action for JP Application No. 2021-542508 Sep. 5, 2022 7 Pages (Translation Included).

* cited by examiner

Echelon
Echelon count  | 2 |

Free lens
▽ Free setting
   Size | 8 |
  ▽ Element 0
     Shortest time | 0 |
     Minimum hold time | 0 |
     Maximum hold time | 0 |
     Weight | 0 |

▽ Element 1
     Shortest time | 1 |
     Minimum hold time | 4 |
     Maximum hold time | 6 |
     Weight | 2 |

▽ Element 2
     Shortest time | 1 |
     Minimum hold time | 5 |
     Maximum hold time | 6 |
     Weight | 3 |

▽ Element 3
     Shortest time | 1 |
     Minimum hold time | 5 |
     Maximum hold time | 7 |
     Weight | 0 |

▽ Element 4
     Shortest time | 1 |
     Minimum hold time | 5 |
     Maximum hold time | 7 |
     Weight | 10 |

▽ Element 5
     Shortest time | 1 |
     Minimum hold time | 5 |

FIG. 8A

| Map name | Town highway | | Load a map | | Load configurations | | | Store | |
|---|---|---|---|---|---|---|---|---|---|
| Lens trigger mileage line list | | Echelon distance | 3 | Chasing distance | 1.2 | Lens tracking speed | 3 | Refresh the ranking | ADD |

--------[Lens ID = 1], this is a fixed lens of a [trunk]

| ID | 1 | | | | | | | | | | |
|---|---|---|---|---|---|---|---|---|---|---|---|
| Sideway ID | 0 | Activation range | 233,0-12 | Following range | 233,0-12 | Application lap count | 0 | | | | |
| Mutually exclusive lens | | Locking mode | 2 | Duration | | Movement time | 9 | End condition | | Modify | Go | Delete |
| | | Rotate | | | | End lens Coordinate | | | | | |
| Start lens Coordinate | | | | | | | | | | | |
| X | -143.2695 | Y | 36.86285 | Z | -502.3755 | X | 35.75293 | Y | 179.9999 | Z | 1.96701e-0 |
| | | | | | | X | -142.4939 | Y | 34.60513 | Z | -719.7189 |

--------[Lens ID = 2], this is a fixed lens of a [trunk]

| ID | 2 | | | | | | | | | | |
|---|---|---|---|---|---|---|---|---|---|---|---|
| Sideway ID | 0 | Activation range | 22-45 | Following range | 25-41 | Application lap count | 99 | | | | |
| Mutually exclusive lens | | Locking mode | 2 | Duration | | Movement time | 0 | End condition | | Modify | Go | Delete |
| | | Rotate | | | | End lens Coordinate | | | | | |
| Start lens Coordinate | | | | | | | | | | | |
| X | -402.7458 | Y | 34.14296 | Z | -838.618 | X | 14.43889 | Y | 76.1803 | Z | 3.5264828 |
| | | | | | | X | -402.7458 | Y | 34.14296 | Z | -838.618 |

FIG. 8B

METHOD AND APPARATUS FOR CONTROLLING PERSPECTIVE SWITCHING, ELECTRONIC DEVICE AND READABLE STORAGE MEDIUM

RELATED APPLICATIONS

This application is a continuation of PCT Application No. PCT/CN2020/096405, entitled "PERSPECTIVE SWITCHING CONTROL METHOD AND APPARATUS, ELECTRONIC DEVICE AND READABLE STORAGE MEDIUM" and filed on Jun. 16, 2020, which claims priority to Chinese Patent Application No. 201910544427.0 filed on Jun. 21, 2019. The two applications are both incorporated herein by reference in their entirety.

FIELD OF THE TECHNOLOGY

This application relates to the field of computers, and in particular, to a method and apparatus for controlling perspective switching, an electronic device and a computer-readable storage medium.

BACKGROUND OF THE DISCLOSURE

In computer game terminal applications, the players are provided with a participating mode and an observation mode. For example, ordinary players can watch game props or game skills used by other players in a round of game through a third-party perspective in the observation mode to gain game operation experience. In another example, a commentator or a referee can also watch a round of game through the third-party perspective in the observation mode to commentate the round of game to other observation players in real-time live broadcast.

In the related art, in order to have a more comprehensive understanding of pictures in each scene of a game, professional players are usually invited to control the switching of the third-party perspective through directed broadcasting equipment, to switch a game picture currently displayed in the third-party perspective to a game picture displayed in the perspective corresponding to certain actions during the round of game. However, the number of such professional game directors is limited, and the operation mode of manual perspective switching control is complicated, which increases the response time of the perspective switching control, thus resulting in a problem of low efficiency of perspective switching control.

SUMMARY

Embodiments of this application provide a method and apparatus for controlling perspective switching, an electronic device and a computer-readable storage medium, capable of automatically switching a perspective and improving the efficiency of perspective switching control.

One aspect of this application provides a method for controlling perspective switching, the method including displaying a virtual scene picture in a game from a target perspective in a client; triggering a key stage in the game and determining a key perspective corresponding to the key stage; and automatically switching the target perspective to the key perspective to display a key scene picture from the key perspective in the client.

Another aspect of this application provides an apparatus for controlling perspective switching, including a first display unit, configured to display a virtual scene picture in a game from a target perspective in a client; a first determining unit, configured to trigger a key stage in the game and determine a key perspective correspond to the key stage; and a first switching unit, configured to automatically switch the target perspective to the key perspective to display a key scene picture in the key perspective in the client.

Another aspect of this application provides a non-transitory computer-readable storage medium, having a computer program stored therein, the computer program being configured to perform, when run, the method for controlling perspective switching.

The embodiments of this application provide an electronic device, including a memory and a processor. A computer program is stored in the memory, and the processor is configured to run the computer program to perform the method for controlling perspective switching.

In embodiments of this application, after entering a round of game, a virtual scene picture in the game is displayed from a target perspective in a client, when a key stage in the game is triggered, a key perspective corresponding to the key stage is determined, and the target perspective is automatically switched to the key perspective to display a key scene picture in the key perspective in the client. That is, if the key stage is triggered, the key scene picture in the key perspective after switching can be displayed in the client, and there is no need for a professional game director to manually control a perspective switching operation, thereby simplifying the operation of perspective switching control, and saving the time of perspective switching control, to achieve the purpose of improving the efficiency of perspective switching control.

BRIEF DESCRIPTION OF THE DRAWINGS

FIG. 8A is a schematic diagram of settings of a free lens according to an embodiment of this application.

FIG. 8B is a schematic diagram of settings of relevant parameters of a fixed lens according to an embodiment of this application.

DESCRIPTION OF EMBODIMENTS

In order to make persons skilled in the art better understand the solutions of this application, the following clearly and completely describes the technical solutions in some embodiments of this application with reference to the accompanying drawings in some embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, claims, and accompanying drawings of this application, the terms "first", "second", and so on are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
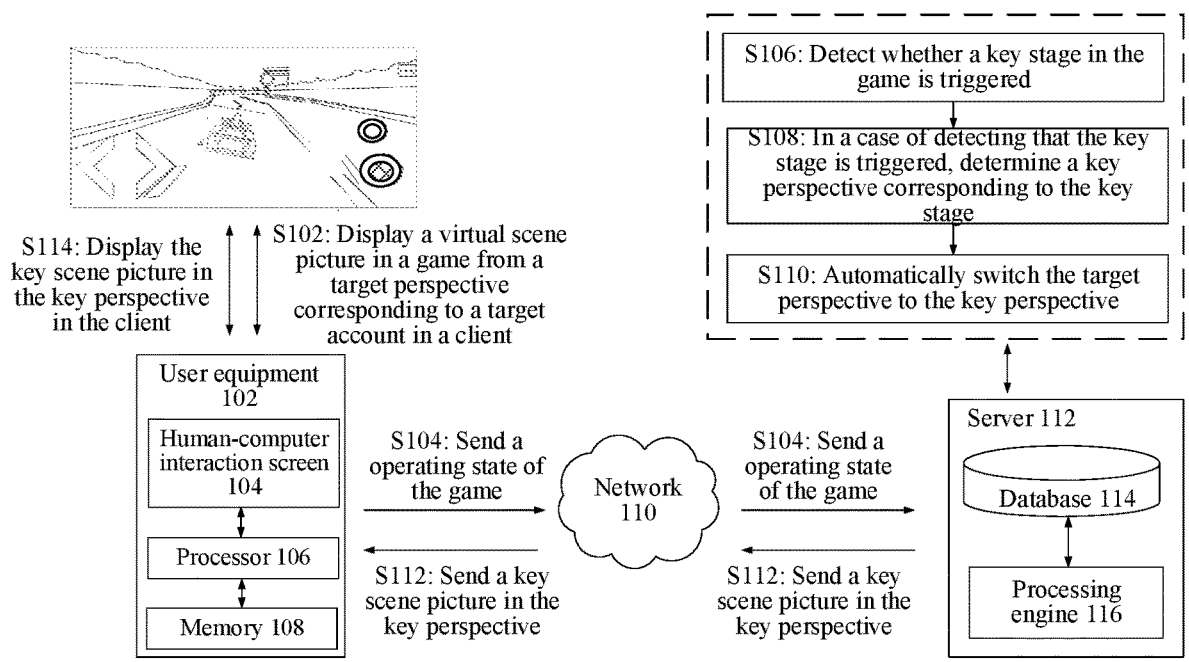
FIG. 1 is a schematic diagram of a network environment of a method for controlling perspective switching according to an embodiment of this application.

According to some embodiments of this application, a method for controlling perspective switching is provided. For example, the method for controlling perspective switching may not be limited to being applied to a system for controlling perspective switching in the network environment as shown in FIG. 1. The system for controlling perspective switching includes a user equipment 102, a network 110, and a server 112. For example, a client with a round of game application (as shown in FIG. 1, it is a racing game application client) is installed in the user equipment 102. The user equipment 102 includes a human-computer interaction screen 104, a processor 106, and a memory 108. The human-computer interaction screen 104 is configured to detect a human-computer interaction operation (such as a touch operation) through a human-computer interaction interface corresponding to the client. The processor 106 is configured to generate a corresponding operation instruction according to the human-computer interaction operation, and use, in response to the control of the operation instruction, a target account of the client to adjust a virtual scene picture displayed in a target perspective. The memory 108 is configured to store the operation instruction and picture resources of the virtual scene picture.

As in step S102, after the client installed in the user equipment 102 uses the target account to enter a round of game, the human-computer interaction screen 104 in the client displays a virtual scene picture in the round of game from a target perspective matching the target account. Then, the processor 106 executes step S104 to synchronously send an operating state of the round of game to the server 112 of the round of game application via the network 110. The server 112 may be an independent physical server, may be a server cluster or a distributed system composed of multiple physical servers, or may be a cloud server that provides cloud computing services. Taking a cloud server (in which a program for perspective switching control is packaged) as an example, a user invokes the perspective switching control service in the cloud service through a terminal, so that the server deployed in the cloud invokes the packaged perspective switching control program to perform steps S106-S110, i.e., detecting whether a key stage in a round of game is triggered, when the key stage is triggered, determining a key perspective matching the key stage, and automatically switching the target perspective to the key perspective. The key scene picture in the key perspective is then sent to the user equipment 102, as in step S112. After obtaining the key scene picture in the key perspective, the user equipment 102 displays the key scene picture in the key perspective in the client through the human-computer interaction screen 104, as in step S114, and stores same to the memory 108.

Figure 2:
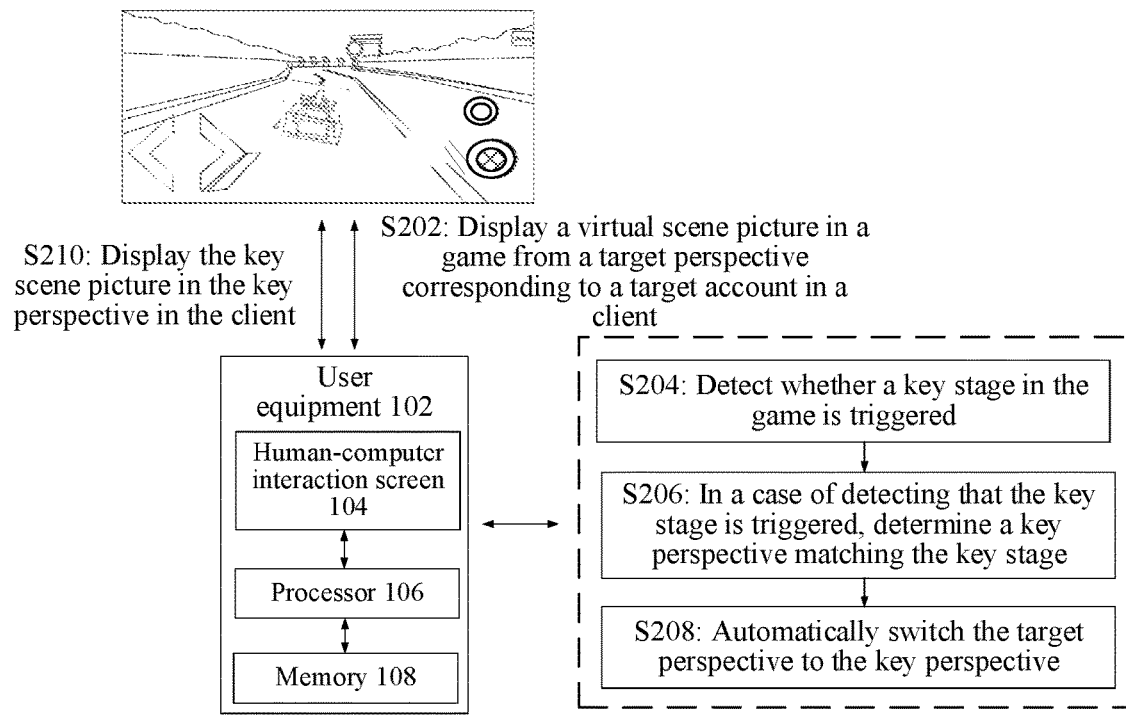
FIG. 2 is a schematic diagram of a hardware environment of a method for controlling perspective switching according to an embodiment of this application.

In addition, the method for controlling perspective switching may not be limited to being applied to a hardware environment as shown in FIG. 2. For example, a client with a round of game application (as shown in FIG. 2, it is a racing game application client) is installed in the user equipment 102. The user equipment 102 includes the human-computer interaction screen 104, the processor 106, and the memory 108. As in step S202, the user equipment 102 displays the virtual scene picture in the round of game from a target perspective matching the target account through the human-computer interaction screen 104. Then, steps S204-S208 are performed by the processor 106, i.e., detecting whether a key stage in a round of game is triggered, when the key stage is triggered, determining a key perspective matching the key stage, and automatically switching the target perspective to the key perspective. Step S210 is then performed, i.e., displaying the key scene picture in the key perspective in the client through the human-computer interaction screen 104, and storing same to the memory 108.

In some embodiments of this application, after using the target account to enter a round of game, the virtual scene picture in the round of game is displayed from a target perspective matching the target account in the client, when a key stage of the round of game is triggered, a key perspective matching the key stage is determined, and the target perspective is automatically switched to the key perspective to display the key scene picture in the key perspective in the client. That is, for the target account, after entering the round of game, whether a key stage in the round of game is triggered may be detected, and when the key stage is triggered, the target perspective of the target account is controlled to automatically switch to the key perspective matching the key stage to directly display the key scene picture in the switched key perspective in the client. There is no need for a professional game director to manually control a perspective switching operation, thereby simplifying the operation of perspective switching control, and saving the time of perspective switching control, to achieve the purpose of improving the efficiency of perspective switching control, thereby overcoming the problem in the related art of low efficiency of perspective switching control.

For example, in some embodiments of this application, the user equipment may be, but is not limited to, electronic devices that support running application clients, such as a mobile phone, a tablet computer, a notebook computer, and a PC. The server and the user equipment may not be limited to realizing data interaction through a network, and the network may include, but is not limited to, a wired network or a wireless network. The wireless network includes: Bluetooth, WIFI, and other networks that implement wireless communication. The wired network may include, but is not limited to, a wide area network, a metropolitan area network, and a local area network. The foregoing is merely an example, which is not limited by embodiments of this application.

Figure 3A:
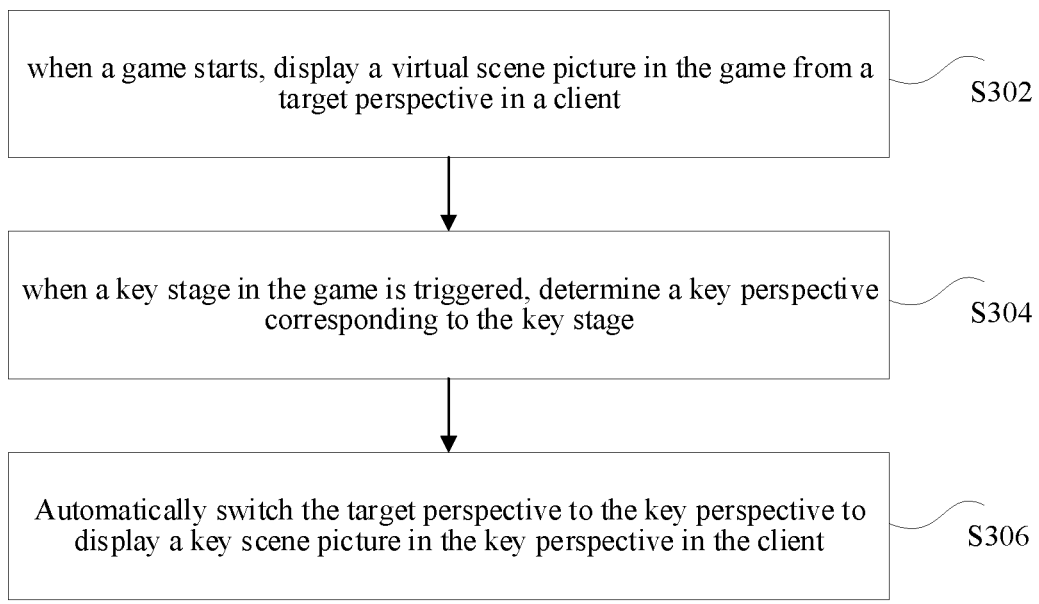
FIG. 3A to FIG. 3C are flowcharts of a method for controlling perspective switching according to an embodiment of this application.

As shown in FIG. 3A, some embodiments of this application provide a method for controlling perspective switching, which can be implemented by various types of electronic devices, such as the server as shown in FIG. 1 and the user equipment as shown in FIG. 2. The method for controlling perspective switching includes the following steps:

S302: When a round of game starts, display a virtual scene picture in the round of game from a target perspective in a client.

S304: When a key stage in the round of game is triggered, determine a key perspective matching the key stage.

S306: Automatically switch the target perspective to the key perspective to display a key scene picture in the key perspective in the client.

The steps of the method shown in FIG. 3A may not be limited to being applied to the system for controlling perspective switching shown in FIG. 1, and being completed through data interaction between the user equipment 102 and the server 112, or may not be limited to being applied to the user equipment 102 shown in FIG. 2, and being completed by the user equipment 102. The foregoing are merely examples, which are not limited by embodiments of this application.

Figure 4:
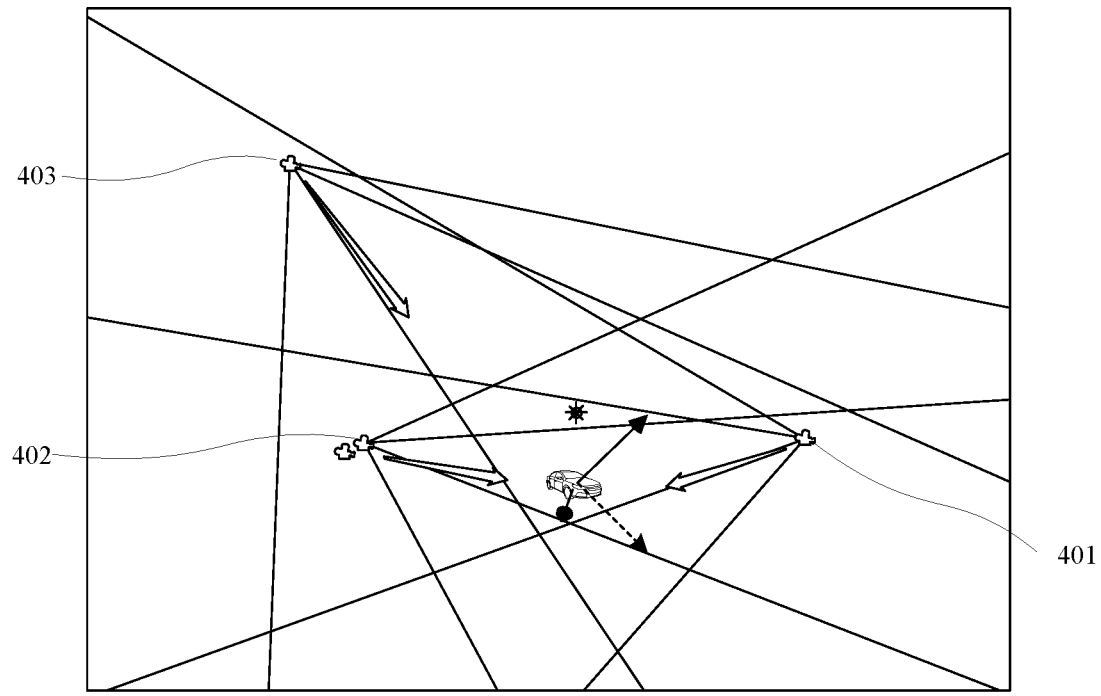
FIG. 4 is a schematic diagram of an observation perspective according to an embodiment of this application.

For example, in some embodiments of this application, the method for controlling perspective switching may not be limited to be used in game applications, such as racing game applications. A round of game of the racing game applications may include, but is not limited to, at least two virtual objects controlled by a player which participate in completing racing game tasks. The virtual objects may include, but are not limited to: virtual characters, virtual equipment, virtual vehicles, and the like. Moreover, in some embodiments of this application, after using a target account to enter a round of game, a virtual scene picture in the round of game may be displayed from a target perspective matching the target account in the client. The target account may not be limited to the account of a player participating in the round of game, but may also be the account of an observer not participating in the round of game. In some embodiments of this application, during the running of a round of game, the target perspective of the target account may not be limited to determining to automatically switch to the key perspective based on a detected key stage, to switch and display scene pictures in different perspectives in the client, without a need for a professional game director to operate, thereby simplifying the operation of perspective switching control, and achieving the purpose of improving the efficiency of perspective switching control. As shown in FIG. 4, the observation perspectives used for observation in the racing game applications may include, but are not limited to: a main perspective for capturing of a main camera of the virtual object, a front perspective for capturing of a front lens 401 of the virtual object, a rear perspective for capturing of a rear camera 402 of the virtual object, a top perspective for capturing of a top camera 403 of the virtual object, and a fixed perspective for capturing of a fixed camera disposed in a round of game scene. The foregoing is merely an example, which is not limited by the embodiments of this application.

For example, in some embodiments of this application, the key stage may not be limited to a process that can redisplay an operating state of the virtual object in a set operating state during running of a round of game, i.e., a round of game progress that the observer pays attention to in the round of game. For example, the key stage may include, but is not limited to a starting stage of a round of game, and a major stage that the virtual object participating in the round of game reaches a target position. The major stage may include, but is not limited to a process that the virtual object reaches a finish line, a process that the virtual object reaches a starting position of a major region (i.e., entering the major region), and the like. In addition, in some embodiments of this application, it may not be limited to using a mileage line on a track in a racing game task to determine whether the virtual object reaches the target position. The foregoing is merely an example, which is not limited by the embodiments of this application.

For example, in some embodiments of this application, it may not be limited to pre-configuring a perspective switching mode for the target account. The perspective switching mode may include, but is not limited to: an individual locking mode and a group locking mode. In the individual locking mode, a single virtual object reaching the target position is first locked, and the target perspective of the target account is switched to the player perspective of the user account corresponding to the single virtual object. In the group locking mode, a target virtual object among group virtual objects that reaches the target position is locked, and the target perspective of the target account is switched to the player perspective of the user account corresponding to the target virtual object. The target virtual object may not be limited to: 1) virtual objects at specified positions in a group, such as a virtual object in a leading position and a virtual object in the center; and 2) virtual objects determined according to the position distribution of the virtual objects in the group. For example, in some embodiments of this application, the player perspective may include, but is not limited to, the following perspectives corresponding to the virtual object: a main perspective, a front perspective, a rear perspective, and a top perspective.

For example, in some embodiments of this application, the key perspective may not be limited to an observation perspective corresponding to a fixed lens disposed in the virtual scene. The key perspective may not be limited to being configured with an effective display duration, a follow range, a movement duration. The effective display duration may not be limited to being used for indicating a maximum duration that the key perspective is allowed to display the captured key scene picture. The follow range may not be limited to being used for indicating a starting observation position and an ending observation position of the locked key virtual object observed in the key perspective. The movement duration is used for indicating the duration of allowing the fixed lens corresponding to the key perspective to move. That is, by adjusting a turning lens of the fixed lens corresponding to the key perspective or controlling the fixed lens to follow the movement, the corresponding followed key scene picture can be displayed. The fixed lens may not be limited to being configured to indicate a preset lens, but not being used to limit the lens to be located at a fixed position. The foregoing is merely an example, which is not limited by the embodiments of this application.

For example, in some embodiments of this application, the key perspective may also be not limited to a shortest display duration. The shortest display duration is used for indicating that it is allowed to switch to other perspectives only when the duration of the target perspective staying at the current key perspective reaches the shortest display duration. The foregoing is merely an example, which is not limited by the embodiments of this application.

For example, in some embodiments of this application, before determining the key perspective matching the key stage, or after displaying the key scene picture in the key perspective in the client, when not detecting that the key stage in the round of game is triggered, a to-be-displayed target object scene picture is determined from a picture resource pool matching the round of game, where the picture resource pool is configured to store candidate object scene pictures in a candidate object perspective that meets a display condition; and the target perspective is switched to a target object perspective corresponding to the target object scene picture, to display the target object scene picture in the target object perspective in the client. The candidate object scene pictures in the picture resource pool are configured with priorities, and the target object scene picture can be determined according to the priorities.

In addition, in some embodiments of this application, the target object scene picture corresponding to the target object perspective may not be limited to being configured with a first display duration and a second display duration. The first display duration is used for indicating a maximum duration allowed for display of the object scene picture, and the second display duration is used for indicating a minimum duration for display of the object scene picture. For example, in some embodiments of this application, when a priority of a previous target scene picture before the current target object scene picture is higher than the priority of the target object scene picture, the previous object scene picture is allowed to be displayed according to the first display duration without being interrupted. Moreover, when the priority of the previous target scene picture before the current target object scene picture is lower than the priority of the target object scene picture, the previous object scene picture is automatically switched to the target object scene picture when the previous object scene picture reaches the end moment of the second display duration. Automatic picture switching is triggered according to the priority of the scene picture, so that the corresponding perspective can also be automatically switched.

Figure 3B:
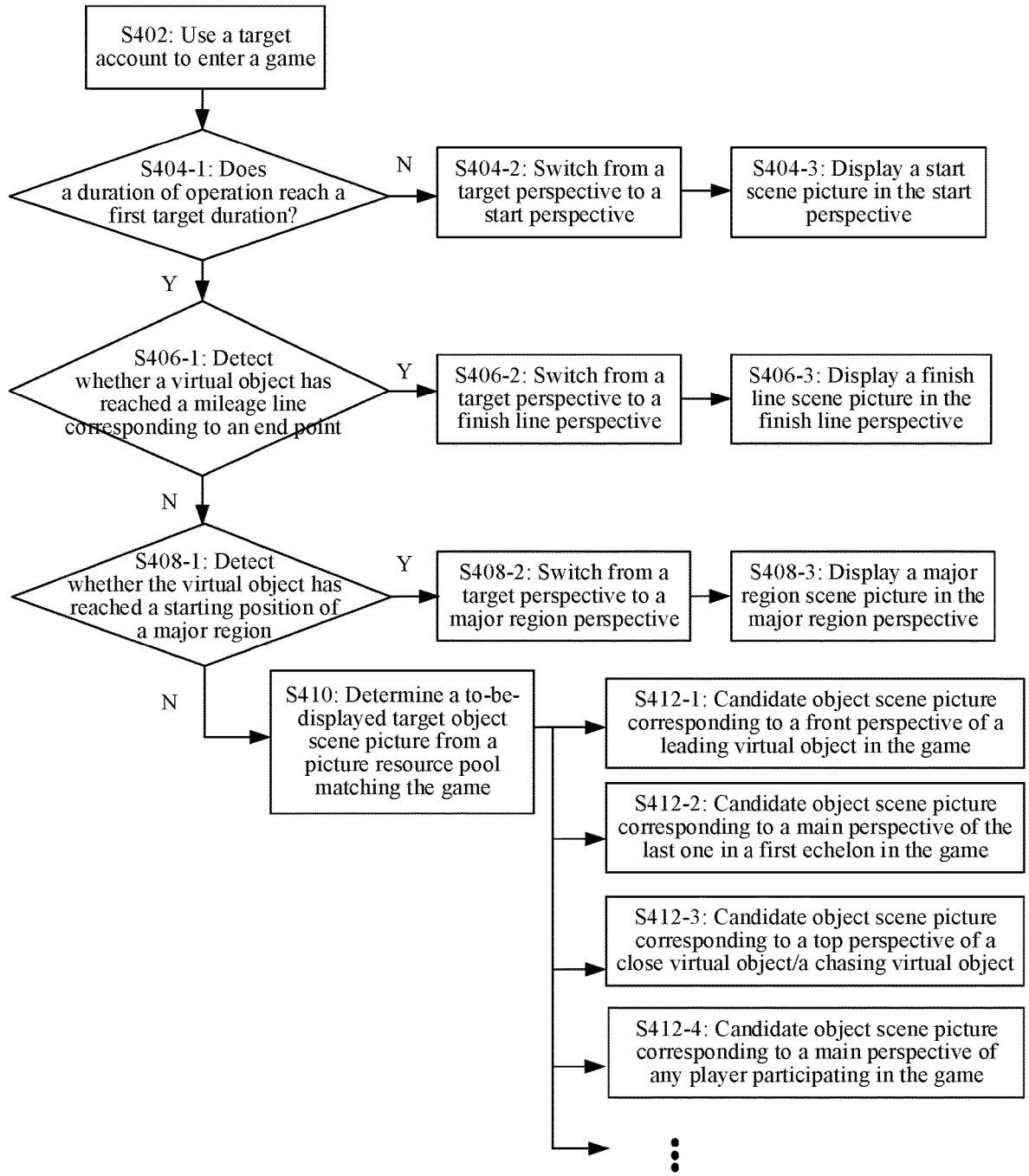

In some embodiments, reference is made to the example shown in FIG. 3B for illustration: after step S402 of using a target account to enter a round of game, step S404-1 of detecting whether a duration from starting the round of game reaches a first target duration is performed. If the duration of operation from the start does not reach the first target duration, step S404-2 is performed, i.e., determining that the round of game is in a starting stage, and switching the target perspective to a start perspective corresponding to the starting stage to display a start scene picture in the open perspective, as in step S404-3. When the duration from the start exceeds the first target duration, step S406-1 is performed, i.e., detecting whether at least one of the virtual objects participating in the round of game reaches a mileage line corresponding to the end point. When detecting that a virtual object reaches the mileage line corresponding to the end point, step S406-2 is performed, i.e., determining that a virtual object in the round of game enters a finish line process, and switching the target perspective to a finish line perspective corresponding to the finish line process to display a finish line scene picture in the finish line perspective, as in step S406-3. If it is not detected that at least one virtual object reaches the mileage line corresponding to the end point, step S408-1 is performed, i.e., detecting whether at least one virtual object reaches a starting position of a major region (such as a curve region where overtaking is easy).

When detecting that at least one virtual object reaches the starting position of the major region, step S408-2 is performed, i.e., determining to trigger a major region process, and switching to a major region perspective corresponding to the major region to display the major region scene picture in the major region perspective, as in step S408-3.

As shown in FIG. 3B, when detecting that the key stage (such as the starting stage, the finish line process, and the major region process) is not triggered, step S410 is performed, i.e., determining a to-be-displayed target object scene picture (i.e., a scene picture corresponding to a free lens) from a picture resource pool matching the round of game, where each free lens can be set as shown in FIG. 8A, so that the scene picture corresponding to each free lens has the shortest time, the hold time and a weight that take effect independently, and the free lens can take effect randomly according to the weight. According to the priorities configured for the candidate object scene pictures in the picture resource pool, the target object scene picture can be randomly determined therefrom. For example, step S412-1 to step S412-4 are arranged: candidate object scene pictures corresponding to a front perspective of a leading virtual object in the round of game in step S412-1, candidate object scene pictures corresponding to a main perspective of the last one in a first echelon in the round of game in step S412-2, candidate object scene pictures corresponding to a top perspective of a close virtual object/a chasing virtual object in step S412-3, and candidate object scene pictures corresponding to a main perspective of any virtual object participating in the round of game in step S412-4. The candidate object scene pictures are merely examples, and the embodiments of this application may also include other candidate object scene pictures, which are not limited here.

According to the embodiments provided by this application, after using the target account to enter a round of game, the virtual scene picture in the round of game is displayed from a target perspective matching the target account in the client, when detecting that a key stage of the round of game is triggered, a key perspective matching the key stage is determined, and the target perspective is automatically switched to the key perspective to display the key scene picture in the key perspective in the client. That is, after entering the round of game, whether a key stage in the round of game is triggered may be detected, and when detecting that the key stage is triggered, the target perspective of the target account is controlled to be automatically switched to the key perspective matching the key stage to directly display the key scene picture in the key perspective after switching in the client. There is no need for a professional game director to manually control a perspective switching operation, thereby simplifying the operation of perspective switching control, and saving the time of perspective switching control, to achieve the purpose of improving the efficiency of perspective switching control, and thus overcoming the problem in the related art of low efficiency of perspective switching control.

In some embodiments, the key stage includes a starting stage and a major stage. The detecting that the key stage in the round of game is triggered includes: when detecting that a duration of start running the round of game does not reach a first target duration, determining that the round of game is in the starting stage; and when detecting that a first virtual object controlled by a first user account participating in the round of game reaches a target position, determining that the round of game enters the major stage.

For example, in some embodiments of this application, the target position may include, but is not limited to, at least one of the following: an end point and a starting position of a major region. When detecting that a virtual object reaches the end point, determining to trigger the finish line process included in the key stage or detecting that a virtual object reaches the starting position of the major region, the major region process included in the key stage is determined to be triggered. In addition, in some embodiments of this application, in racing game applications, it may not be limited to determining whether the virtual object reaches the target position according to the mileage line reached by the virtual object.

In some embodiments, when detecting that the first virtual object reaches the target position, and the target position is the end point, the target perspective is switched to an observation perspective of the first user account corresponding to the first virtual object.

Figure 5:
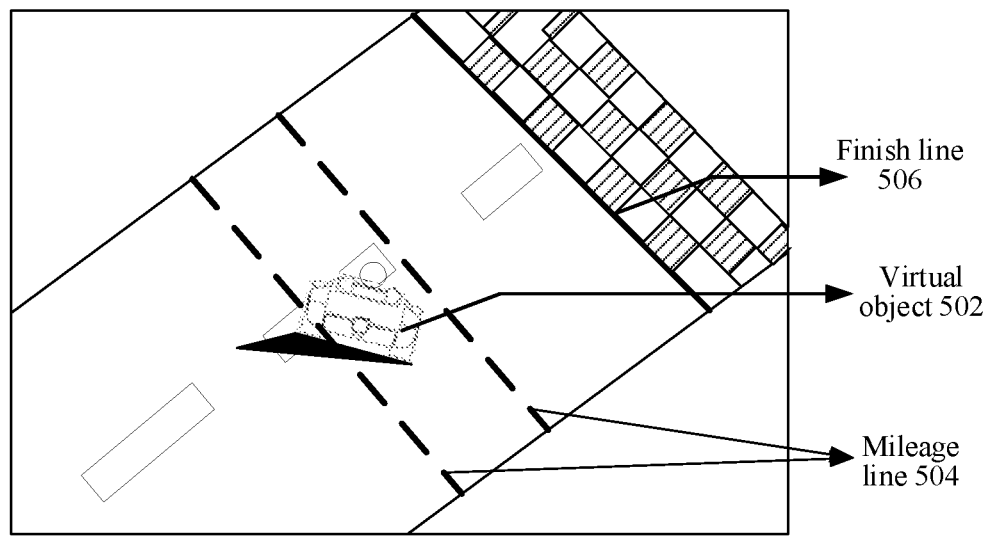
FIG. 5 is a schematic diagram of a scene picture currently observed from a target perspective according to an embodiment of this application.

Reference is made to the example shown in FIG. 5 for illustration. Assuming that taking a racing game application as an example, after using a target account to enter a round of game, the currently observed scene picture of the target perspective of the target account is as shown in FIG. 5, the currently displayed scene picture includes a virtual object 502 participating in the round of game, the dotted line shown in the round of game track is a mileage line 504, and the virtual object 502 is crossing the mileage line 504 and is about to reach a finish line 506.

Figure 6A:
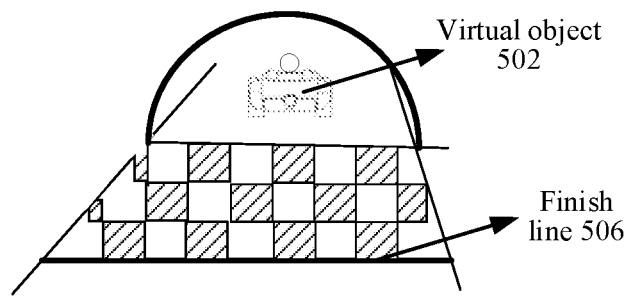
FIG. 6A is a schematic diagram of a scene picture displayed from a rear perspective according to an embodiment of this application.
Figure 6B:
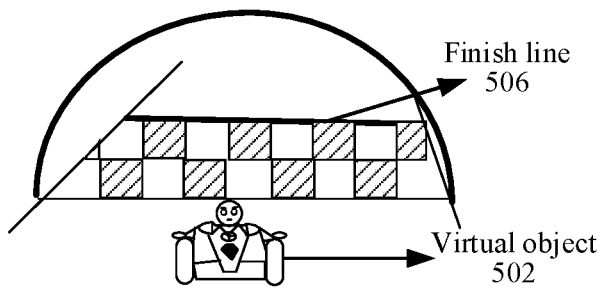
FIG. 6B is a schematic diagram of a scene picture displayed from a front perspective according to an embodiment of this application.
Figure 6C:
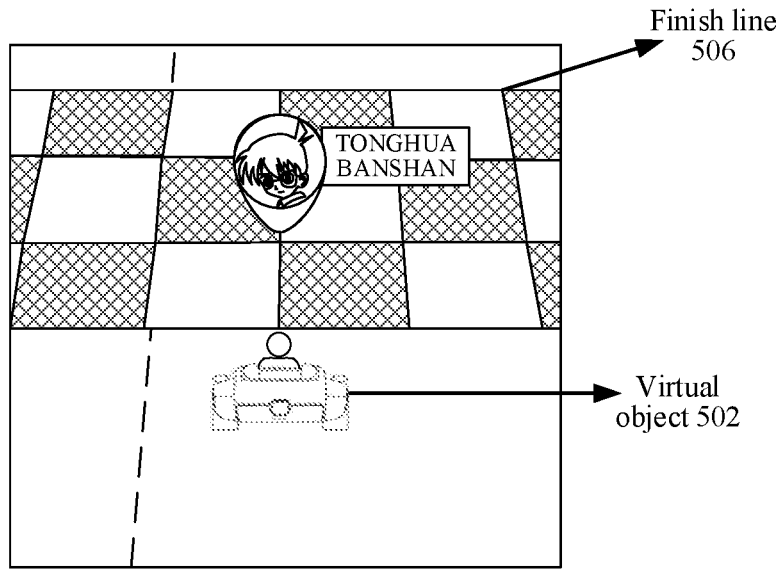
FIG. 6C is a schematic diagram of a scene picture displayed from a top perspective according to an embodiment of this application.

For example, when detecting that the duration of start running the round of game has exceeded the first target duration (for example, n seconds), whether at least one virtual object reaches the mileage line corresponding to the target position in the round of game is detected. Assuming that it is detected that the virtual object 502 reaches the finish line 506, the finish line process (the key stage) is determined to be triggered, and the target perspective is switched to the finish line perspective to display the finish line scene picture. The finish line perspective may be as shown in FIG. 6A, which is a scene picture displayed in the rear perspective of the virtual object 502 crossing the finish line 506. The finish line perspective may also be as shown in FIG. 6B, which is a scene picture displayed in the front perspective of the virtual object 502 crossing the finish line 506. The finish line perspective may also be as shown in FIG. 6C, which is a scene picture displayed in the top perspective of the virtual object 502 crossing the finish line 506.

In some embodiments, the automatically switching the target perspective to the key perspective to display a key scene picture in the key perspective in the client includes: when detecting that the first virtual object reaches the target position and the target position is not the end point, determining a perspective switching mode of the target account; when the perspective switching mode is an individual locking mode, automatically switching the target perspective to an observation perspective of the first user account corresponding to the first virtual object; when the perspective switching mode is a group locking mode, determining a group where the first virtual object is currently located; obtaining an observation perspective of a target user account corresponding to a target virtual object in the group, the target virtual object being at a key position in the group; and automatically switching the target perspective to an observation perspective of the target user account corresponding to the target virtual object.

For example, in some embodiments of this application, the perspective switching mode may include, but is not limited to the individual locking mode and the group locking mode. The individual locking mode is used for indicating that a single virtual object reaching the target position (for example, the starting position of the major region) is first locked, and the target perspective of the target account is switched to the player perspective of the user account corresponding to the single virtual object. That is, the display effect of the switched perspective may not be limited to a case where the target position is the end point in the foregoing example. Assuming that the single virtual object is the virtual object 502 as shown in FIG. 5, the target perspective can be switched to the observation perspective of the user account corresponding to the locked virtual object 502, such as the main perspective, the front perspective (as shown in FIG. 6B), the rear perspective (as shown in FIG. 6A), and the top perspective (as shown in FIG. 6C). The implementation process is not repeated in the embodiments of this application.

Figure 7:
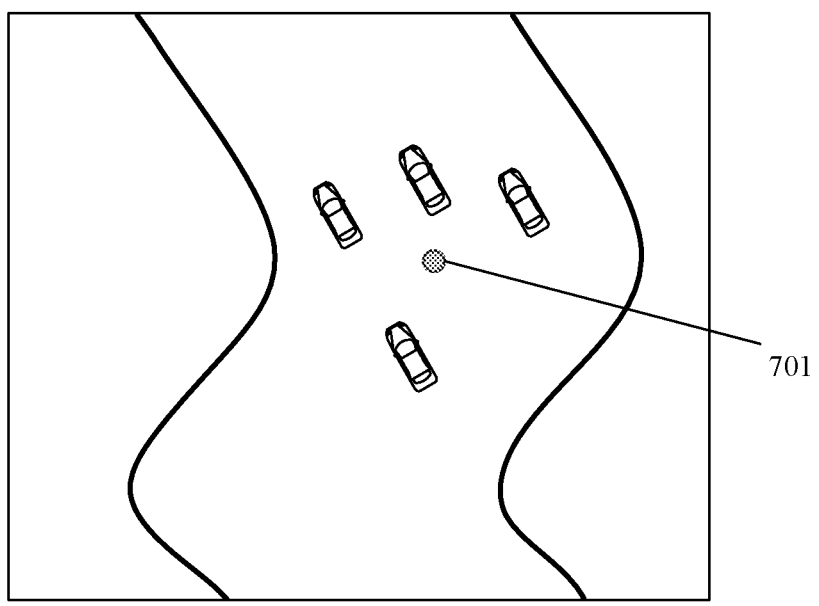
FIG. 7 is a schematic diagram of a group according to an embodiment of this application.

The group locking mode is used for indicating that a target virtual object among group virtual objects that reaches the target position is locked, and the target perspective of the target account is switched to the player perspective of the user account corresponding to the target virtual object. The target virtual object may not be limited to: virtual objects at specified positions in a group, such as a virtual object in a leading position and a virtual object in the center. As shown in FIG. 7, assuming that it is determined that a group (i.e., an echelon) includes four virtual objects (i.e., virtual vehicles), a midpoint of all the virtual vehicles in the echelon on plane coordinates can be determined as an echelon lock point 701; and based on the echelon lock point, the closest virtual object is selected as the target virtual object locked in the echelon. The foregoing is merely an example, which is not limited by the embodiments of this application.

In some embodiments of this application, the group may not be limited to being determined based on a linear distance between every two of the virtual objects in the plane coordinates. For example, for the virtual objects, virtual objects whose linear distance therebetween is less than a target distance value can be determined to belong to the same group or echelon. This is merely an example, and the approach of determining the group is not limited by the embodiments of this application.

According to the embodiments of this application, a switching policy for switching control of the target perspective is determined based on the detected target position reached by the first virtual object and the perspective switching mode configured for the target account, thereby automatically triggering the switching of the target perspective when a given condition is achieved, and enabling the target perspective of the target account to give priority to focus on the key stage in the round of game. Not only the operation of perspective switching control is simplified, but also the target account can be prevented from missing the observation of the key scene picture corresponding to the key stage, to ensure the comprehensiveness and effectiveness of the observation.

In some embodiments, before the obtaining an observation perspective of a target user account corresponding to a target virtual object in the group, the method further includes: when there is no virtual object after the first virtual object and in a range where a distance from the first virtual object is less than or equal to a first distance, determining the first virtual object as the target virtual object, and determining the first user account as the target user account; when a virtual object exists behind the first virtual object and within the range where the distance from the first virtual object is less than the first distance, obtaining a ranking position of the first virtual object; when the ranking position indicates that the first virtual object is not located in a target sequence of the group, determining the first virtual object as the target virtual object, and determining the first user account as the target user account; and when the ranking position indicates that the first virtual object is located in the target sequence of the group, obtaining a second virtual object appearing after the first virtual object as a next first virtual object.

Figure 3C:
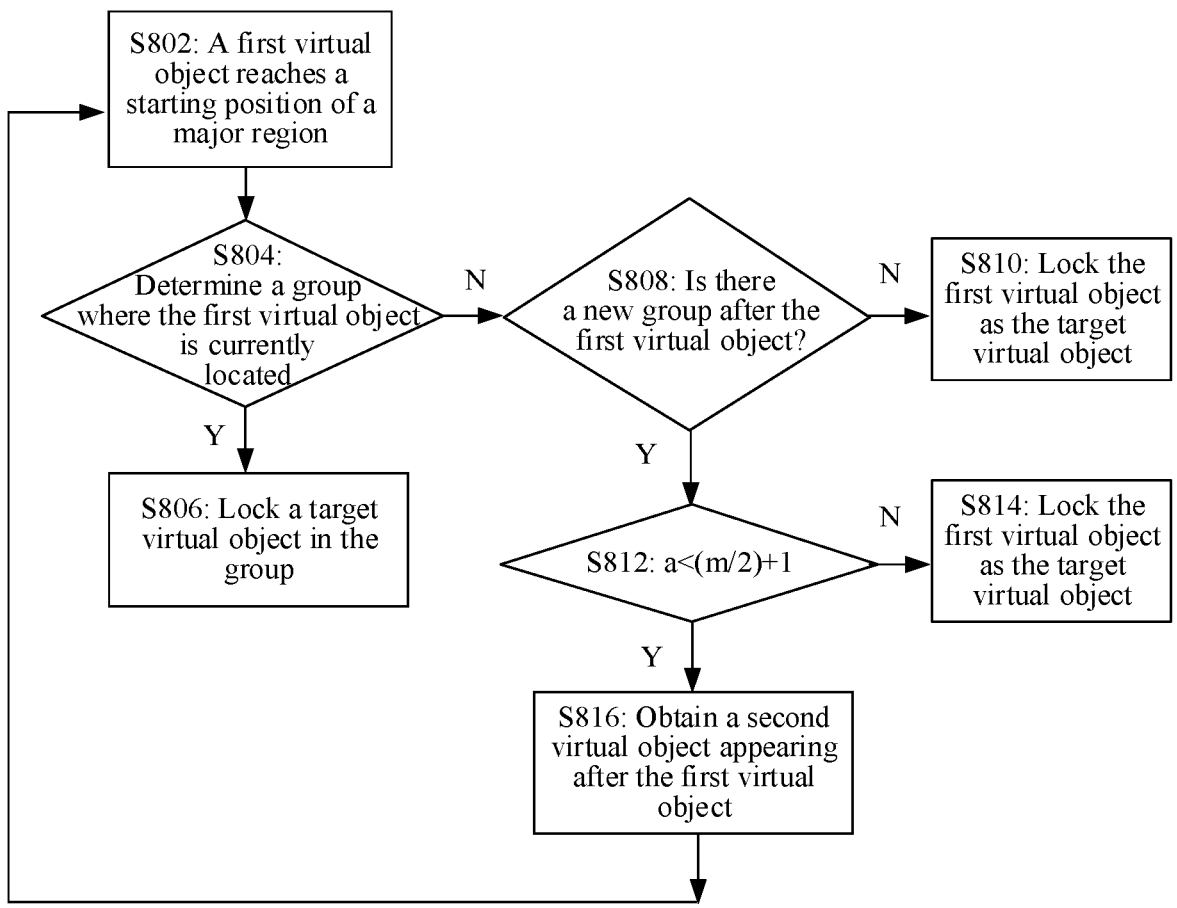

For example, in some embodiments of this application, it may not be limited to determining the target virtual object according to the distribution of the virtual objects in a group. The distribution may not be limited to being determined based on a determining result of whether the first virtual object is in a new group located behind, and the ranking position in the new group located behind. Reference is made to the example shown in FIG. 3C for illustration. Assuming that the total number of the virtual objects participating in the round of game is m, the ranking position of the first virtual object is redisplayed by a. As in steps S802-S804, after the first virtual object reaches the starting position of the major region, a group where the first virtual object is currently located is determined, and when determining that the first virtual object is currently located in the group, step S806 is performed, i.e., locking the target virtual object in the group. When determining that the first virtual object is not currently located in the group, step S808 is performed, i.e., determining whether there is a new group after the first virtual object. When determining that there is no new group, it is indicated that the group distribution is relatively dispersed, and step S810 is performed, i.e., locking the first virtual object as the target virtual object in the group. When determining that there is a new group, step S812 is performed, i.e., determining whether the ranking position a of the first virtual object is less than m/2+1 (a target sequence), and when determining that a is greater than or equal to m/2+1, locking the first virtual object as the target virtual object in the group, as in step S814. When determining that a is less than m/2+1, it is indicated that the group distribution is relatively concentrated, and as in step S816, a second virtual object appearing after the first virtual object is obtained as a next first virtual object, and the foregoing determining process is continued.

According to the embodiments of this application, whether to determine the first virtual object as a locked target virtual object in a group is determined based on the determining result of whether the first virtual object is in the new group located behind, and the ranking position thereof in the new group located behind, thereby flexibly determining the target virtual object in the group, to avoid excessively concentrated observation of virtual objects in an echelon, and improve the flexibility of perspective switching control and the coverage rate of switching observation.

In some embodiments, the automatically switching the target perspective to the key perspective to display a key scene picture in the key perspective in the client includes: determining an effective display duration and a follow range corresponding to the key perspective, the follow range including a starting observation position and an ending observation position of a locked key virtual object in the key scene picture; when the effective display duration is not reached, displaying a key scene picture corresponding to a process of the key virtual object from the starting observation position to the ending observation position in the client; and when the key virtual object does not reach the ending observation position but the effective display duration has been reached, displaying a key scene picture corresponding to the key virtual object within the effective display duration in the client.

In some embodiments of this application, the automatically switching the target perspective to the key perspective to display a key scene picture in the key perspective in the client includes determining a movement duration corresponding to the key perspective; and displaying, in the client, the key scene picture obtained by observation through the key perspective within the movement duration.

In some embodiments of this application, it may not be limited to pre-configuring the relevant parameters of the fixed lens corresponding to the key perspective, and the configuration effect of the relevant parameters may be as shown in FIG. 8B. The foregoing relevant parameters may include, but are not limited to, the following contents:

1) Identity (ID) of the current fixed lens: searching for corresponding lens configurations through the ID, and then setting the lens.

2) Sideway ID: a map used in a round of game has many sideways, and mileage line IDs of different sideways are also different.

3) Activation range: a mileage line range activated by the lens, and when the virtual object reaches the mileage line range corresponding to the lens, the lens is activated so that the lens captures the picture content in the round of game scene.

4) Follow range: when the lens is activated, the locked virtual object can be obtained by calculation, and within the mileage line range, the lens locks the virtual object for observing same.

5) Application lap count: the fixed lens only takes effect in this lap count. 0 means that the fixed lens takes effect in any lap count.

6) Mutually exclusive lens: it is mutually exclusive with the lens whose ID is filled in.

7) Locking mode: a group locking mode or an individual locking mode. For example, ID "2" is used for specifying a to-be-locked target virtual object according to the pre-configured parameters of the group, and ID "1" is used for locking the single virtual object that activates the lens. The foregoing IDs are merely examples, which are not limited by the embodiments of this application.

8) Effective display duration: a duration during which the lens takes effect.

9) Movement duration: the lens starts to move from coordinates of a start lens according to the movement duration until it reaches coordinates of an end lens.

10) Start lens: the starting position of the fixed lens, if there is no movement duration, it will stay at this position forever.

11) End lens: after filling in the movement duration, it will move according to the movement duration, and is used for indicating the end point of the lens movement.

Figure 9:
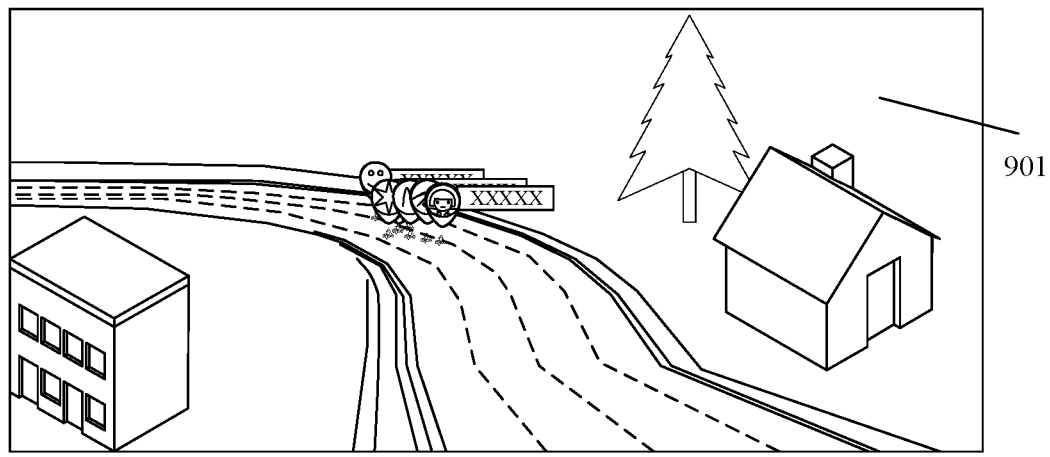
FIG. 9 is a schematic diagram of a key scene picture according to an embodiment of this application.

The fixed lens corresponding to the key perspective may follow the locked virtual object to achieve following movement, and may also control a rotation angle of the lens to follow and photograph the locked moving virtual object. As shown in FIG. 9, the fixed lens is movable, and when the effective display duration does not reach the end time, the fixed lens corresponding to the key perspective is controlled to move according to the movement duration to display, in the client, a key scene picture 901 corresponding to the key virtual object in a process from the starting observation position to the ending observation position. When the key virtual object does not reach the ending observation position but the effective display duration has been reached, a key scene picture corresponding to the key virtual object within the effective display duration is displayed in the client. That is, when the effective display duration has not been reached, the fixed lens may be controlled to always follow the locked virtual object until the virtual object leaves the ending observation position, thereby realizing full observation. However, when the effective display duration has been reached, following photography of the locked virtual object is stopped.

According to the embodiments of this application, the effective control of the key perspective is realized according to relevant control parameters configured for the key perspective, to ensure that after the target perspective is switched to the key perspective, the running situation of the round of game can be observed in a comprehensive and flexible manner to avoid missing the key stage.

In some embodiments, before the determining a key perspective matching the key stage, or after the displaying a key scene picture in the key perspective in the client, the method further includes: when not detecting that the key stage in the round of game is triggered, determining a to-be-displayed target object scene picture from a picture resource pool matching the round of game, where the picture resource pool is configured to store candidate object scene pictures in a candidate object perspective that meets a display condition; and switching the target perspective to a target object perspective corresponding to the target object scene picture, to display the target object scene picture in the target object perspective in the client.

In some embodiments, the determining a to-be-displayed target object scene picture from a picture resource pool matching the round of game includes: determining the target object scene picture according to the priorities configured for the candidate object scene pictures in the picture resource pool.

In addition, in some embodiments, before the determining a to-be-displayed target object scene picture from a picture resource pool matching the round of game, the method further includes: detecting an operating state of a user account participating in the round of game; and obtaining, according to the operating state, the candidate object scene pictures in the candidate object perspective that meets the display condition, and storing same in the picture resource pool. The foregoing display condition may include, but is not limited to: being in a leading position in a round of game, being the last in a first echelon in a round of game, being the last in a round of game, being in a close/chasing state in a round of game, any virtual object participating in a round of game, or the like. The foregoing is merely an example, which is not limited by the embodiments of this application.

In some embodiments, the switching the target perspective to a target object perspective corresponding to the target object scene picture includes: when a priority of the target object scene picture is higher than priorities of other candidate object scene pictures in the picture source pool but is lower than a priority of a previous object scene picture displayed prior to the target object scene picture, obtaining a first display duration configured for the previous object scene picture, the first display duration being used for indicating a maximum duration allowed for display of the previous object scene picture; and when display time of the previous object scene picture reaches the first display duration, switching the target perspective to the target object perspective corresponding to the target object scene picture.

In some embodiments of this application, when the priority of a previous target scene picture before the current target object scene picture is higher than the priority of the target object scene picture, the previous object scene picture is allowed to be displayed according to the first display duration without being interrupted, to directly switch to the target object scene picture.

In some embodiments, the switching the target perspective to a target object perspective corresponding to the target object scene picture includes: when a priority of the target object scene picture is higher than priorities of other candidate object scene pictures in the picture source pool and is higher than a priority of a previous object scene picture displayed prior to the target object scene picture, obtaining a second display duration configured for the previous object scene picture, the second display duration being used for indicating a minimum duration required for display of the previous object scene picture; when display time of the previous object scene picture does not reach the second display duration, continuing to display the previous object scene picture; and when the display time of the previous object scene picture reaches the second display duration, switching the target perspective to the target object perspective corresponding to the target object scene picture.

When the priority of the previous target scene picture before the current target object scene picture is lower than the priority of the target object scene picture, the previous object scene picture is automatically switched to the target object scene picture when the previous object scene picture reaches the end moment of the second display duration.

According to the embodiments of this application, the automatic switching of each candidate object scene picture is triggered according to the priority configured for each candidate object scene picture in the picture resource pool, so that the corresponding perspective can also be automatically switched. Therefore, the flexibility and simplicity of the perspective switching operation are ensured.

For brevity of description, the foregoing method embodiments are described as a series of combinations of actions. However, it is to be understood by persons skilled in the art that this application is not limited to the order of the described actions because according to this application, some steps may be performed in other order or simultaneously. Next, it is also to be understood by persons skilled in the art that the described embodiments in the specification are all exemplary embodiments, and the actions and modules involved are not necessarily essential to this application.

Figure 10:
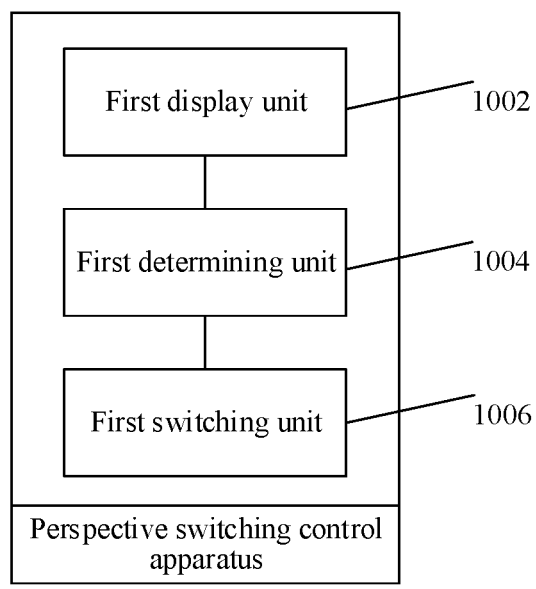
FIG. 10 is a schematic structural diagram of an apparatus for controlling perspective switching according to an embodiment of this application.

The embodiments of this application provide an apparatus for controlling perspective switching configured to implement the foregoing method for controlling perspective switching. As shown in FIG. 10, the apparatus includes: a first display unit 1002 configured to display, when a round of game starts, a virtual scene picture in the round of game from a target perspective in a client; a first determining unit 1004 configured to determine, when a key stage in the round of game is triggered, a key perspective matching the key stage; and a first switching unit 1006 configured to automatically switch the target perspective to the key perspective to display a key scene picture in the key perspective in the client.

The foregoing units of the apparatus shown in FIG. 10 may not be limited to being applied to a user equipment 102 and a server 112 of the system for controlling perspective switching shown in FIG. 1, or may not be limited to being applied to the user equipment 102 shown in FIG. 2. The foregoing are merely examples, which are not limited by the embodiments of this application.

For example, in some embodiments of this application, the apparatus for controlling perspective switching may not be limited to be used in game applications, such as racing game applications. A round of game of the racing game applications may include, but is not limited to, at least two virtual objects controlled by a player which participate in completing racing game tasks. The virtual objects may include, but are not limited to: virtual characters, virtual equipment, virtual vehicles, and the like. Moreover, in some embodiments of this application, the target account may not be limited to the account of the player participating in the round of game, but the account of an observer not participating in the round of game. In some embodiments of this application, during the running of a round of game, the target perspective of the target account may not be limited to determining to automatically switch to the key perspective based on a detected key stage, to switch and display scene pictures in different perspectives in the client, without a need for a professional game director to operate, thereby simplifying the operation of perspective switching control, and achieving the purpose of improving the efficiency of perspective switching control. The perspectives used for observation in the racing game applications may include, but are not limited to: a main perspective for capturing of a main camera of the virtual object, a front perspective for capturing of a front lens of the virtual object, a rear perspective for capturing of a rear camera of the virtual object, a top perspective for capturing of a top camera of the virtual object, and a fixed perspective for capturing of a fixed camera disposed in a round of game scene. The foregoing is merely an example, which is not limited by the embodiments of this application.

In some embodiments, the key stage includes a starting stage and a major stage. The apparatus further includes: a second determining unit configured to determine, when a duration of start running the round of game does not reach a first target duration, that the round of game is in the starting stage; and a third determining unit configured to determine, when a first virtual object controlled by a first user account participating in the round of game reaches a target position, that the round of game enters the major stage.

In some embodiments, the first switching unit 1006 includes: a first switching module configured to switch, when the first virtual object reaches the target position, and the target position is an end point, the target perspective to an observation perspective of the first user account corresponding to the first virtual object.

In some embodiments, the first switching unit 1006 includes: a first determining module configured to determine, when the first virtual object reaches the target position and the target position is not an end point, a perspective switching mode; a second switching module configured to automatically switch, when the perspective switching mode is an individual locking mode, the target perspective to an observation perspective of the first user account corresponding to the first virtual object; a second determining module configured to determine, when the perspective switching mode is a group locking mode, a group where the first virtual object is currently located; a first obtaining module configured to obtain an observation perspective of a target user account corresponding to a target virtual object in the group, the target virtual object being at a key position in the group; and a third switching module configured to automatically switch the target perspective to an observation perspective of the target user account corresponding to the target virtual object.

In some embodiments, the apparatus further includes: a third determining module configured to determine, when there is no virtual object after the first virtual object and in a range where a distance from the first virtual object is less than or equal to a first distance, the first virtual object as the target virtual object and the first user account as the target user account; a second obtaining module configured to obtain, when a virtual object exists behind the first virtual object and within the range where the distance from the first virtual object is less than the first distance, a ranking position of the first virtual object; a fourth determining module configured to determine, when the ranking position indicates that the first virtual object is not located in a target sequence of the group, the first virtual object as the target virtual object and the first user account as the target user account; and a third obtaining module configured to obtain, when the ranking position indicates that the first virtual object is located in the target sequence of the group, a second virtual object appearing after the first virtual object as a next first virtual object.

In some embodiments, the first switching unit 1006 includes: a fifth determining module configured to determine an effective display duration and a follow range corresponding to the key perspective, the follow range including a starting observation position and an ending observation position, and the starting observation position and the ending observation position corresponding to a locked key virtual object in the key scene picture; a first display module configured to display, when the effective display duration is not reached, a key scene picture of the key virtual object in the client, the key scene picture including a process from the starting observation position to the ending observation position; and a second display module configured to display, when the key virtual object does not reach the ending observation position and the effective display duration has been reached, a key scene picture corresponding to the key virtual object within the effective display duration in the client.

In some embodiments, the first switching unit 1006 includes: a sixth determining module configured to determine a movement duration corresponding to the key perspective; and a third display module configured to display the key scene picture in the client, the key scene picture being obtained by observation through the key perspective within the movement duration.

In some embodiments, the apparatus further includes: a fourth determining unit configured to determine, when the key stage in the round of game is not triggered, a to-be-displayed target object scene picture from a picture resource pool matching the round of game, the picture resource pool being configured to store candidate object scene pictures, and the candidate object scene pictures being located in a candidate object perspective that meets a display condition; and a second switching unit configured to switch the target perspective to a target object perspective corresponding to the target object scene picture, to display the target object scene picture in the target object perspective in the client.

In some embodiments, the fourth determining unit includes: a seventh determining module configured to determine the target object scene picture according to priorities configured for the candidate object scene pictures in the picture resource pool.

In some embodiments, the second switching unit includes: a fourth obtaining module configured to obtain, when a priority of the target object scene picture is higher than priorities of other candidate object scene pictures in the picture source pool and is lower than a priority of a previous object scene picture displayed prior to the target object scene picture, a first display duration configured for the previous object scene picture, the first display duration being used for indicating a maximum duration allowed for display of the previous object scene picture.

In some embodiments, a fourth switching module is configured to switch, when display time of the previous object scene picture reaches the first display duration, the target perspective to the target object perspective corresponding to the target object scene picture.

In some embodiments, the second switching unit includes: a fifth obtaining module configured to obtain, when a priority of the target object scene picture is higher than priorities of other candidate object scene pictures in the picture source pool and is higher than a priority of a previous object scene picture displayed prior to the target object scene picture, a second display duration configured for the previous object scene picture, the second display duration being used for indicating a minimum duration required for display of the previous object scene picture; a fourth display module configured to continue to display, when display time of the previous object scene picture does not reach the second display duration, the previous object scene picture; and a fifth switching module configured to switch, when the display time of the previous object scene picture reaches the second display duration, the target perspective to the target object perspective corresponding to the target object scene picture.

In some embodiments, the apparatus further includes: a detection unit configured to detect an operating state of a user account participating in the round of game before determining the to-be-displayed target object scene picture from the picture resource pool matching the round of game; and an obtaining unit configured to obtain, according to the operating state, the candidate object scene pictures in the candidate object perspective that meets the display condition, and store same in the picture resource pool.

Figure 11:
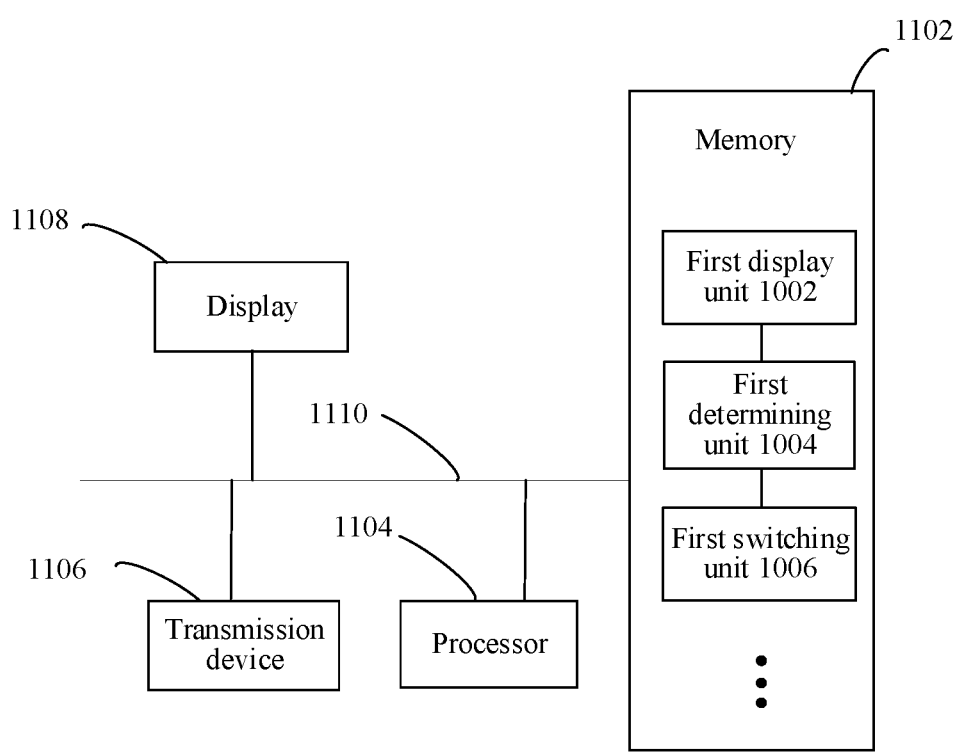
FIG. 11 is a schematic structural diagram of an electronic device according to an embodiment of this application.

The embodiments of this application also provide an electronic device configured to implement the method for controlling perspective switching. As shown in FIG. 11, the electronic device includes a memory 1102 and a processor 1104. A computer program is stored in the memory 1102, and the processor 1104 is configured to run the computer program to perform the steps in any of the method embodiments.

In some embodiments of this application, the electronic device may be in at least one of a plurality of network devices in a computer network.

In some embodiments of this application, the processor may be configured to run the computer program to perform the following steps: when a round of game starts, displaying a virtual scene picture in the round of game from a target perspective in a client; when a key stage in the round of game is triggered, determining a key perspective matching the key stage; and automatically switching the target perspective to the key perspective to display a key scene picture in the key perspective in the client.

For example, persons of ordinary skill in the art can understand that the structure shown in FIG. 11 is only for illustration, and the electronic device may also be a terminal device such as a smart phone (such as an Android phone and an iOS phone), a tablet computer, a handheld computer, a mobile Internet device (MID), and a PAD. FIG. 11 does not limit the structure of the electronic device. For example, the electronic device may further include more or fewer components (such as a network interface) than those shown in FIG. 11, or have a configuration different from that shown in FIG. 11.

The memory 1102 can be configured to store software programs and modules, such as program instructions/modules corresponding to the method for controlling perspective switching and apparatus in the embodiments of this application. The processor 1104 executes various functional applications and data processing by running the software programs and modules stored in the memory 1102, that is, realizes the method for controlling perspective switching. The memory 1102 may include a high-speed random memory, and may also include a non-volatile memory, for example, one or more magnetic storage apparatuses, a flash memory, or another non-volatile solid-state memory. In some embodiments, the memory 1102 may include memories remotely disposed with respect to the processor 1104, and these remote memories may be connected to the terminal through a network. Examples of the network include, but are not limited to, the Internet, an intranet, a local area network, a mobile communication network, and a combination thereof. The memory 1102 may not be limited to storing the displayed scene pictures and so on. As an example, as shown in FIG. 11, the memory 1102 may not be limited to including the first display unit 1002, the first determining unit 1004, and the first switching unit 1006 in the apparatus for controlling perspective switching. In addition, the memory may further include, but is not limited to, other module units in the apparatus for controlling perspective switching, and no repeated description is provided in this example.

For example, the transmission device 1106 is configured to receive or send data via a network. The network example may include a wired network and a wireless network. In an example, the transmission device 1106 includes a network interface controller (NIC), which may be connected to another network device and a router through a network cable, to communicate with the Internet or a local area network. In an example, the transmission device 1106 is a radio frequency (RF) module, which communicates with the Internet in a wireless manner.

In addition, the electronic device further includes: a display 1108 configured to display scene pictures in the round of game; and a connection bus 1110 configured to connect module components in the electronic device.

The embodiments of this application further provide a computer-readable storage medium having a computer program stored therein, the computer program being configured to perform, when run, the steps in any of the method embodiments. For example, in some embodiments of this application, the computer-readable storage medium may be configured to store a computer program for performing the following steps: when a round of game starts, displaying a virtual scene picture in the round of game from a target perspective in a client; when a key stage in the round of game is triggered, determining a key perspective matching the key stage; and automatically switching the target perspective to the key perspective to display a key scene picture in the key perspective in the client.

For example, in some embodiments of this application, persons of ordinary skill in the art can understand that all or some steps in the various methods in the embodiments may be completed by a program instructing related hardware of the terminal device. The program may be stored in a computer-readable storage medium. The computer-readable storage medium may include: a flash disk, a read-only memory (ROM), a random access memory (RAM), a magnetic disk, an optical disk, or the like.

The sequence numbers of the foregoing embodiments of this application are merely for description purpose but do not imply the preference among the embodiments.

When the integrated unit or module in the foregoing embodiments is implemented in a form of a software functional unit and sold or used as an independent product, the integrated unit or module may be stored in the foregoing computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection through some interfaces, units, or modules, and may be electrical or of other forms.

The units or modules described as separate components may or may not be physically separated, and the components displayed as units or modules may or may not be physical units or modules, and may be located in one place or may be distributed over a plurality of network units. Some or all of the units may be selected based on actual needs to achieve the objectives of the solutions of the embodiments of this application.

In addition, functional units or modules in the embodiments of this application may be integrated into one processing unit, or each of the units or modules may be physically separated, or two or more units may be integrated into one unit or module. The integrated unit or module may be implemented in the form of hardware, or may be implemented in a form of a software functional unit or module.

The foregoing descriptions are merely exemplary implementations of this application. A person of ordinary skill in the art may further make several improvements and modifications without departing from the principle of this application, and the improvements and modifications fall within the protection scope of this application.

INDUSTRIAL APPLICABILITY

In some embodiments of this application, a client displays, when a round of game starts, a virtual scene picture of the round of game from a target perspective, automatically switches, when a key stage in the round of game is triggered, the target perspective to a key perspective corresponding to the key stage, and displays a key scene picture in the key perspective. Accordingly, when the key stage is triggered, the key scene picture in the switched key perspective can be displayed in the client, thereby simplifying the operation of perspective switching control, and saving the time of perspective switching control, to improve the efficiency of perspective switching control.

What is claimed is:

1. A method for switching perspectives in a computer game, executed by an electronic device, the method comprising:
    displaying a virtual scene picture in a game from a target perspective in a client;
    triggering a key stage in the game and determining a key perspective corresponding to the key stage; and
    automatically switching the target perspective to the key perspective to display a key scene picture from the key perspective in the client, comprising:
        determining whether a first virtual object reaches a target position of a region in the game, wherein the target position is not an end point of the region;
        in response to determining that the first virtual object reaches the target position, determining whether to activate a perspective switching mode selected from an individual locking mode and a group locking mode;
        in response to the individual locking mode being activated, automatically switching the target perspective to an observation perspective of a first user account corresponding to the first virtual object; and
        in response to the group locking mode being activated, determining a group where the first virtual object is currently located, to obtain an observation perspective of a target user account corresponding to a target virtual object in the group, the target virtual object being at a key position in the group, and the target perspective being automatically switched to an observation perspective of the target user account corresponding to the target virtual object.

2. The method according to claim 1, wherein
the key stage comprises a starting stage and a major stage; and
triggering the key stage in the game comprises:
    in response to determining that a duration of from start game does not reach a first target duration, determining that the game is in the starting stage; and
    in response to determining that the first virtual object controlled by the first user account participating in the game reaches the target position, triggering the major stage of the game.

3. The method according to claim 2, wherein the automatically switching the target perspective to the key perspective comprises:
    in response to determining that the first virtual object reaches the end point of the region, switching the target perspective to an observation perspective of the first user account corresponding to the first virtual object.

4. The method according to claim 1, wherein before the obtaining an observation perspective of a target user account corresponding to a target virtual object in the group, the method further comprises:
    in response to determining that there is no virtual object in a distance range after the first virtual object, determining the first virtual object as the target virtual object, and determining the first user account as the target user account; and
    in response to determining that there is a virtual object in a distance range after the first virtual object:
        obtaining a ranking position of the first virtual object;
        in response to determining that the ranking position indicates that the first virtual object is not located in a target ranking range of the group, determining the first virtual object as the target virtual object, and determining the first user account as the target user account; and in response to determining that the ranking position indicates that the first virtual object is located in the target ranking range of the group, obtaining a second virtual object appearing after the first virtual object as a next first virtual object.

5. The method according to claim 4, further comprising: after obtaining the second virtual object appearing after the first virtual object as the next first virtual object, repeating the steps of automatically switching the target perspective based on the next first virtual object.

6. The method according to claim 1, wherein the client is logged in with a second account, and the second account is an observer not participating in a round of the game.

7. An apparatus for controlling perspective switching, comprising a memory and a processor, the memory storing a computer program, and the processor being configured to run the computer program to:

display a virtual scene picture in a game from a target perspective in a client;

trigger a key stage in the game and determine a key perspective correspond to the key stage; and automatically switch the target perspective to the key perspective to display a key scene picture in the key perspective in the client, comprising:

determining whether a first virtual object reaches a target position of a region in the game, wherein the target position is not an end point of the region;

in response to determining that the first virtual object reaches the target position, determining whether to activate a perspective switching mode selected from an individual locking mode and a group locking mode;

in response to the individual locking mode being activated, automatically switching the target perspective to an observation perspective of a first user account corresponding to the first virtual object; and in response to the group locking mode being activated, determining a group where the first virtual object is currently located, to obtain an observation perspective of a target user account corresponding to a target virtual object in the group, the target virtual object being at a key position in the group, and the target perspective being automatically switched to an observation perspective of the target user account corresponding to the target virtual object.

8. The apparatus according to claim 7, wherein the key stage comprises a starting stage and a major stage; and the processor is further configured to:

determine, in response to determining that a duration of start the game does not reach a first target duration, that the game is in the starting stage; and determine, in response to determining that the first virtual object controlled by the first user account participating in the game reaches the target position, that the game enters the major stage.

9. The apparatus according to claim 8, wherein the processor is further configured to:

switch, in response to determining that the first virtual object reaches the end point of the region, the target perspective to the observation perspective of the first user account corresponding to the first virtual object.

10. The apparatus according to claim 7, wherein the processor is further configured to:

determine, in response to determining that there is no virtual object in a distance range after the first virtual object, the first virtual object as the target virtual object and the first user account as the target user account; and in response to determining that a virtual object exists in a distance range behind the first virtual object:

obtain a ranking position of the first virtual object;

determine, in response to determining that the ranking position indicates that the first virtual object is not located in a target ranking range of the group, the first virtual object as the target virtual object and the first user account as the target user account; and obtain, in response to determining that the ranking position indicates that the first virtual object is located in the target ranking range of the group, a second virtual object appearing after the first virtual object as a next first virtual object.

11. A non-transitory computer-readable storage medium, comprising a program stored therein, the program, when executed by one or more processors, causing the one or more processors to perform:

displaying a virtual scene picture in a game from a target perspective in a client;

triggering a key stage in the game and determining a key perspective corresponding to the key stage; and automatically switching the target perspective to the key perspective to display a key scene picture from the key perspective in the client, comprising:

determining whether a first virtual object reaches a target position of a region in the game, wherein the target position is not an end point of the region;

in response to determining that the first virtual object reaches the target position, determining whether to activate a perspective switching mode selected from an individual locking mode and a group locking mode;

in response to the individual locking mode being activated, automatically switching the target perspective to an observation perspective of a first user account corresponding to the first virtual object; and in response to the group locking mode being activated, determining a group where the first virtual object is currently located, to obtain an observation perspective of a target user account corresponding to a target virtual object in the group, the target virtual object being at a key position in the group, and the target perspective being automatically switched to an observation perspective of the target user account corresponding to the target virtual object.

* * * * *